Figure 1:
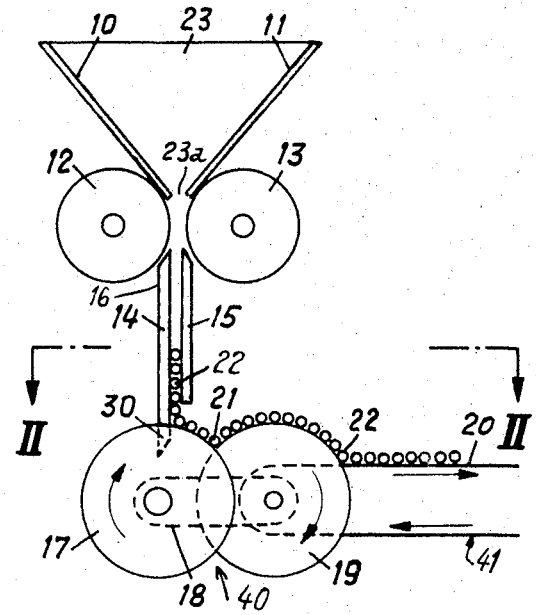

United States Patent Office 3,315,784
Patented Apr. 25, 1967

3,315,784
APPARATUS FOR LOADING TRANSPORT BANDS OR THE LIKE WITH ROD-LIKE ELEMENTS, PARTICULARLY WELDING ELECTRODES
Willy Pöll, Zurich, Switzerland, assignor to Holding Intercito SA., Zurich, Switzerland, a corporation of Panama
Filed Jan. 5, 1966, Ser. No. 518,849
Claims priority, application Switzerland, Jan. 12, 1965, 377/65
4 Claims. (Cl. 198—62)

The present invention has reference to an improved apparatus for charging or loading an at least approximately horizontally disposed conveyor means or transport band with rod-like elements, particularly welding electrodes, which fall out of a supply magazine through the agency of a vertical guide channel means located beneath said supply magazine. Although for convenience in description the invention will be described hereinafter in conjunction with the handling of welding electrodes, it is to be clearly understood that it can be used for most types of rod-like elements.

Apparatuses of the mentioned type are preferably employed in connection with packaging machines for welding electrodes. With prior art known apparatuses for the automatic packaging of goods in the form of welding electrodes, the latter are initially introduced into a supply magazine which narrows towards its lower end. Oftentimes jarring or vibrating shafts are mounted at the sides of the supply magazine which ensure that the goods are continuously shaken into a vertical channel which starts at the lowest location of the magazine. It is possible to adjust the width of the guide channel such that the rods are arranged singly and in superimposed fashion in the form of a vertical row. Typically, a horizontally extending conveyor or transport band passes beneath the guide channel. The spacing of the one rear guide wall of the channel from the transport band is smaller than the diameter of the rod, the spacing of the other, forward guide wall sufficiently large that the rod bearing upon the transport band in each case can be laterally conveyed away.

Experience has shown that by means of such a relatively simple arrangement, it is possible to convey up to five hundred rods per minute which have a diameter of about ten millimeters. Nonetheless, this number or throughput rate is generally smaller than the efficiency of modern production machines. It is practically impossible to further increase the withdrawal speed when using the same principles of operation explained above, since the rods must first be accelerated in horizontal direction by the transport band before they reach the same speed as such band. During the period of acceleration the rods, however, slip upon the band so that it is never really compactly loaded. It is also for this reason that the available conveyor surface of the band is utilized that much more poorly the greater its transport speed.

Attempts have been made to eliminate such disadvantage in that a to and fro moving plunger was installed which was situated in the direction of travel of the transport band, the movement of which, in a very short time, accelerated the welding electrodes ropping out of the guide channel to the horizontal velocity of the transport band and, thus, considerably shortened the path of slippage. However, such a system is also associated with disadvantages. For instance, the impact of the plunger against the rods, with rapid impact movement, can break the electrodes or at least damage their surface. This is particularly disadvantageous if the apparatus is used for electrodes consisting of a soft core and a brittle covering material or coating. Apart from this, it has been found that the discontinuous plunger movement can, in fact, be disadvantageous at high speeds if, namely, in consequence of the non-preventable irregularity in the supply of the welding electrodes from the guide channel, the plunger is not able to contact an electrode during each movement, yet however, during its work stroke, when it is not pushing an electrode, blocks the outlet of the guide channel and prevents dropping-out of the next electrode.

Accordingly, it is a primary object of this invention to provide an improved apparatus of the mentioned type which effectively overcomes the aforementioned disadvantages.

Another, more specific object of this invention relates to an improved apparatus for efficiently and rapidly charging transport means with rod-like objects.

Still a further significant object of this invention has reference to an improved apparatus for effectively transferring rod-like members from a supply station to a conveyor station in a highly reliable, efficient and speedy manner without damage to such rod-like members.

Yet a further, noteworthy object of this invention relates to an improved construction of apparatus for charging conveyor means with rod-like members, particularly welding electrodes, which apparatus is relatively simple in construction, relatively trouble-free in operation, capable of handling a large number of rod-like members per unit of time, relatively economical to manufacture, and not readily subject to breakdown.

Generally speaking, the inventive apparatus is manifested by the features that a transport mechanism is provided between the lower outlet or discharge end of the guide channel and the conveyor means, e.g. transport band, and where the transport speed of said transport mechanism is continuous and greater than that of the conveyor means.

Owing to the inventive apparatus, it is possible to load the conveyor means with up to two thousand welding electrodes per minute and wherein the electrodes are parallelly aligned upon such conveyor means and without damaging them. The charging or loading density of the conveyor means can be adjusted by regulating the transport speed or velocity of the transport mechanism. It is even conceivable to regulate such loading density by providing a separate regulatable drive for both the transport mechanism and conveyor means and then controlling the difference in velocity of transport mechanism and conveyor means. By suitably constructing the transport mechanism and guide channel, it is possible to adapt the apparatus for handling welding electrodes of different dimensions by carrying out simple adjustment of individual components.

Figure 2:
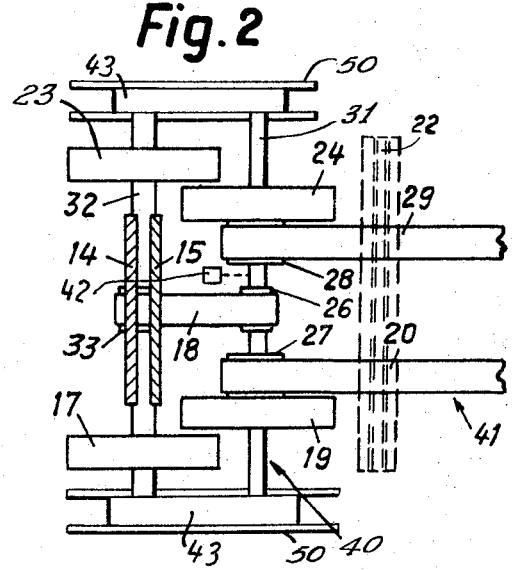

Other features, objects and advantages of the invention will become apparent by reference to the following detailed description and drawing in which:

FIGURE 1 schematically illustrates a preferred embodiment of apparatus for the loading or charging of conveyor means, e.g., transport band means, and from which there can be seen the cooperation of the supply magazine, guide channel, transport mechanism and conveyor means; and FIGURE 2 schematically depicts the preferred embodiment of FIGURE 1 as viewed along the line II—II thereof.

Describing now the drawing, it will be recognized that in FIGURE 1 the supply magazine 23 for the rod-like members handled by the inventive apparatus, e.g., welding electrodes 22, is bounded by both of the walls 10 and 11. At the lower end of these walls 10 and 11 which converge towards one another to form the discharge opening 23a, there are located at both sides of said walls the vibrating or jarring shafts 12 and 13. The vibrational motion of these shafts 12 and 13 aligns the welding electrodes within the supply magazine 23 in substantial parallelism with respect to one another and ensures that the discharge opening 23a does not become clogged. On the contrary, the welding electrodes 22 are jarred without interruption into the guide channel means 16 located beneath the discharge opening 23a of the supply magazine 23. Moreover, such guide channel means 16 is formed of the rear guide wall or ledge 14, the lower end 30 of which is situated lower than the periphery of both withdrawal disks or wheels 17 and 23 of the transport mechanism 40, and also of the forward guide wall or ledge 15, the lower end 30a of which is disposed at a sufficiently large height or elevation in order to permit lateral withdrawal of electrodes which bear upon both these withdrawal disks 17 and 23 and project laterally past the sides thereof. The inner width of the guide channel means 16 is capable of being adjusted in suitable manner between two to twenty millimeters, and is regulated such that the electrodes 22 located in said guide channel means 16 are always stacked on top of one another.

The exemplary depicted conveyor means or transport band, generally designated by reference character 41, can be composed of two conveyor bands 20 and 29. This conveyor means 41 is driven by any suitable prime mover, for instance by means of the schematically depicted regulatable variable speed drive motor 42 which drives the shaft 31. The deflecting rollers 27 and 28 of the conveyor bands 20 and 29 respectively, are rigidly connected with this shaft 31. Upon this same shaft 31 there are also disposed both of the disks or wheels 19 and 24 of the transport mechanism 40 which serve to parallelly align the articles, e.g., electrodes 22, as well as the belt pulley disk. These three disks or wheels 19, 24 and 26 are also all rigidly coupled for rotation with this shaft 31. The belt pulley disk 26 is coupled through the intermediary of the pulley belt 18 with the belt pulley disk 33, the latter in turn being rigidly connected with the supporting shaft 32 upon which there is affixed for rotation both of the withdrawal disks or wheels 17 and 23 of the transport mechanism 40. Due to the described arrangement, in the illustrative embodiment the conveyor means or transport band unit 41 simultaneously serves to transmit the driving force for the withdrawal disks 17, 23 and the parallel-aligning disks or wheels 19, 24 of the transport mechanism 40.

It will be appreciated that the relationship of the diameter of the deflecting rollers 27 and 28 to that of the parallel-aligning disks or wheels 19 and 24 and that of the belt pulley disk 26—which has the same diameter as the belt pulley disk 33—is selected such that the peripheral velocity of the withdrawal disks or wheels 17, 23 and parallel-aligning disks or wheels 19, 24 is the same with respect to one another and larger than the transport speed of the conveyor means 41. Moreover, not only do the disks or wheels 17, 19, 23 and 24 advantageously possess the same diameter, but the horizontal spacing of the supporting shafts 31 and 32 from one another is preferably smaller than 1.5 times the radius of any such aforesaid disk or wheel.

The electrodes 22 falling out of the guide channel means 16 come to bear upon the withdrawal disks or wheels 17 and 23 which remove these electrodes laterally and somewhat downwardly, as best seen by referring to FIGURE 1. When the electrodes have reached the location where they come from the withdrawal disks or wheels 17 and 23 and are transferred to the parallel-aligning disks or wheels 19 and 24, as schematically indicated at the location of electrode 21 of FIGURE 1, then each such electrode is located at a four-point support which aligns this rod exactly at right angles to the direction of movement. The parallel-aligning disks 19 and 24 then take over further transport of the rods or electrodes 22 to the conveyor means 41.

It is further to be appreciated that the schematically shown common bearing block means 43 provided for both shafts 31 and 32 can be constructed such that they can be horizontally and vertically displaced with respect to the stationary guide channel means 16, for instance by being displaceably mounted in suitable known guide means or guide rails 50. By virtue of the possible vertical displacement, the apparatus can be accomodated to different electrode diameters and owing to the possible horizontal displacement it is possible to influence the number of transported electrodes. Practical experience has shown that loading or charging of the conveyor means 41 can be best regulated by adjusting the speed of the withdrawal disks 17, 23 and parallel-aligning disks 19, 24. A variant of the transport mechanism 40 would be, for example, a wide band which travels between both of the conveyor bands 20 and 29 and the speed of which would be larger than that of the conveyor means 41.

Due to the continuous movement of the withdrawal disks or wheels 17, 23, the rods are quickly, yet without jerking movement, accelerated to a predominantly horizontally directed velocity which is greater than the transport speed of the conveyor means 41. It is for this reason that the conveyor means 41 can remove fewer electrodes than delivered to it with a dense or compact charging of the parallel-aligning disks 19, 24. In this manner, depending upon the relationship of the transport speed of the disks and the conveyor means, either so many rods are delivered to such conveyor means that such is densely loaded or, in fact, there appears a damming up at the parallel-aligning disks 19, 24 which acts as a welcome buffer in the event that the electrode supply from the guide channel means 16 does not take place uniformly.

While there is shown and described present preferred embodiments of the invention, it is to be distinctly understood that the invention is not limited thereto, but may be otherwise variously embodied and practised within the scope of the following claims.

What is claimed is:

1. In combination with an at least approximately horizontally disposed conveyor means, an apparatus for charging said conveyor means with rod-like elements, particularly welding electrodes, which comprises a supply magazine for welding electrodes, substantially vertical guide channel means disposed beneath said supply magazine for receiving welding electrodes therefrom, said guide channel means including a lower discharge end for the departure of the welding electrodes, and transport mechanism located between said lower discharge end and said conveyor means capable of being continuously driven at a greater transport speed than that of said conveyor means, said transport mechanism comprising two pairs of wheel members located beneath said guide channel means, a respective shaft member upon which each pair of wheel members is fixedly mounted.

2. The combination as defined in claim 1 wherein all four wheel members of said two pairs possess the same diameter, and drive means for driving said four wheel members at the same peripheral speed, the horizontal spacing between said shaft members being smaller than 1.5 times the radius of any given one of said wheel members.

3. The combination as defined in claim 1, further including common horizontally displaceable bearing block means in which both shaft members for said two pairs of wheel members are mounted.

4. The combination as defined in claim 3, wherein said bearing block means are also vertically displaceable.

References Cited by the Examiner

UNITED STATES PATENTS

| | | | |
|---|---|---|---|
| 1,885,892 | 11/1932 | Bronander | 198—76 |
| 2,142,271 | 1/1939 | Herrmann. | |
| 2,858,046 | 10/1958 | Pollmann | 221—200 X |
| 3,206,065 | 9/1965 | Netta | 221—201 |
| 3,245,135 | 4/1966 | Netta et al. | 29—155.55 |

FOREIGN PATENTS 553,512  12/1956  Italy.

EVON C. BLUNK, *Primary Examiner.*

M. L. AJEMAN, *Assistant Examiner.*